July 23, 1935.  A. D. BRAASCH ET AL  2,008,895
SICKLE GUARD
Filed June 28, 1930  2 Sheets-Sheet 2
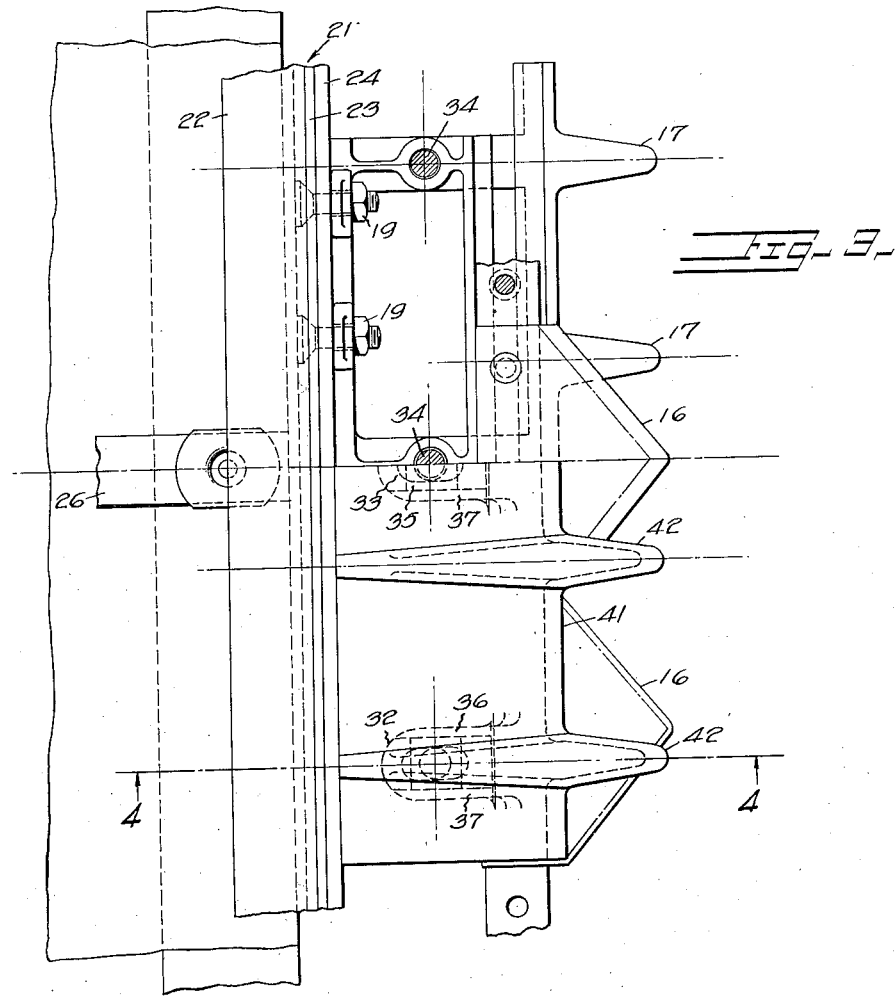
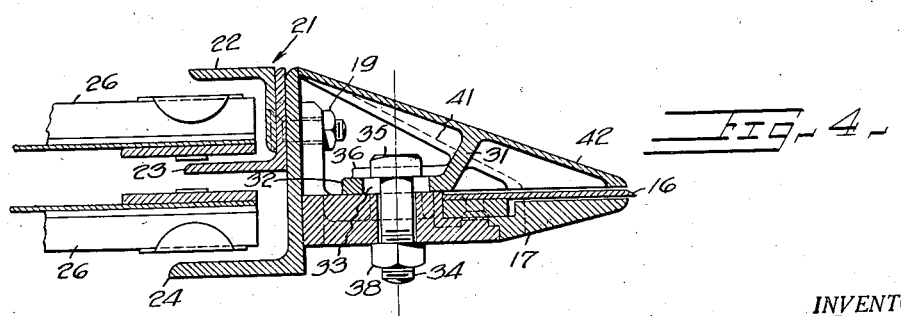
INVENTORS
AUGUST D. BRAASCH
HORATIO W. SMITH
BY NORRIS WALTON
ATTORNEYS.

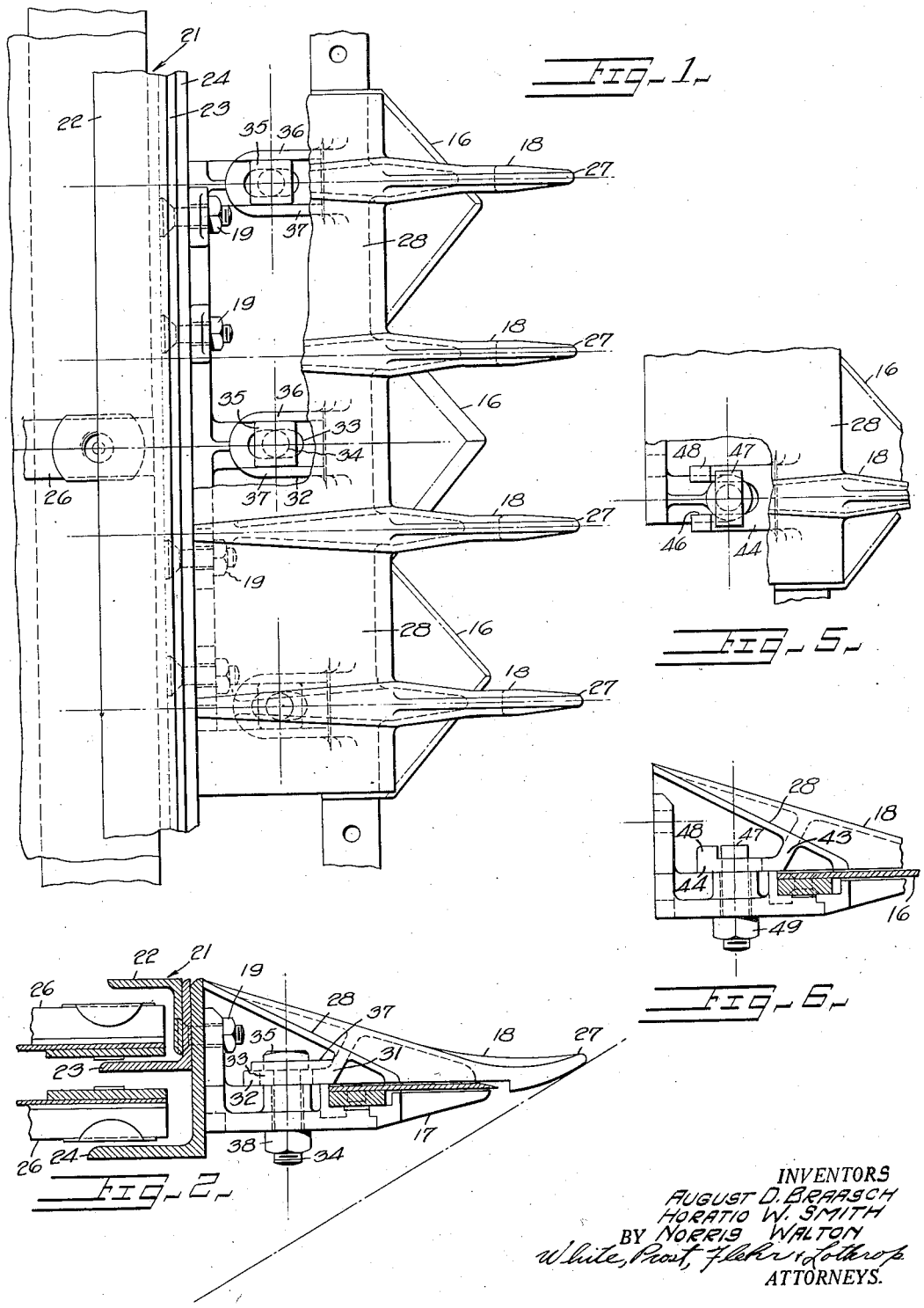

Patented July 23, 1935

2,008,895

UNITED STATES PATENT OFFICE 2,008,895

SICKLE GUARD

August D. Braasch, Horatio W. Smith, and Norris Walton, San Leandro, Calif., assignors to Caterpillar Tractor Co., San Leandro, Calif., a corporation of California Application June 28, 1930, Serial No. 464,582

11 Claims. (Cl. 56—298)

This invention relates to sickle bars in harvesting machinery. It is frequently desirable in harvesters to convert the sickle bar from a standard bar to a trash guard bar, or vice versa. It has previously been necessary in changing from one type of guard to another type in order to meet varying harvesting conditions, to dismantle practically the entire sickle bar assembly, including the pitman and numerous fastening devices. The time required for this operation is measured in hours and for that reason is often omitted to the detriment of the harvest. Heretofore, as mentioned, this conversion has required an undue amount of time and labor and it is an object of this invention to devise a way for facilitating the change from one type of guard to the other.

Another object is to devise a sickle guard provided with a detachable upper guard.

Still another object is to devise a sickle bar capable of conversion from a trash guard bar to a standard bar and vice versa, without replacing parts which are common to both types of bars.

The foregoing and other objects are attained in the embodiment of the invention shown in the drawings, in which Fig. 1 is a plan view of a standard sickle bar constructed in accordance with our invention.

Fig. 2 is an end view of the standard sickle bar shown in Fig. 1.

Fig. 3 is a plan view of a trash guard bar embodying certain features of this invention.

Fig. 4 is a cross section taken on line 4—4 of Fig. 3.

Fig. 5 is a fragmentary plan view of a modification with part of the upper guard broken away to show the construction.

Fig. 6 is a side view of the modification shown in Fig. 5.

In Figs. 1 and 2, we have shown a standard sickle bar constructed in accordance with our invention, comprising a sickle 16, a lower guard 17 and an upper guard 18. The lower guard 17 is secured by bolts 19 to a header frame 21 which is in the form of an angle iron one side 22 of which constitutes the upper draper guide. The bolts 19 serve also to secure the lower draper guide, comprising angle irons 23 and 24, to header frame 21. The upper and lower runs of a draper 26 operate in the guides. The upper sickle guard comprises a series of similar, aligned units each including a plurality of spaced, elongated fingers 27, for parting the grain to be cut, merging with an inclined surface 28 between the fingers 27 for directing the cut grain over the sickle bar and onto the draper 26.

For securing the upper guard 18 in place, there is provided, preferably integral with guard 18, a bracket 31 having a pad 32 which is disposed in abutting relationship with lower guard 17. A slot 33 is provided in the pad for receiving a bolt 34, the head 35 of which is prevented from turning by raised guides 36 and 37 formed on the pad 32. Bolt 34 passes through a suitable aperture in guard 17 which with the planar surface of guard 17, which is disposed in abutting relation with the planar surface of pad 32, forms a mounting or fastening station for securing upper guard 18 in assembled position. By this construction, the upper guard 18 may be easily and quickly mounted merely by tightening readily accessible nuts 38 on the bolts 34.

When it is desired to convert the standard sickle bar shown in Figs. 1 and 2 into a trash guard bar as shown in Figs. 3 and 4, all that is necessary is to remove the upper guards 18 and substitute therefor another series of guard units 41 having short fingers 42. This operation requires only the removal of bolts 34. In making the changeover from one type of guard to another, the common elements such as sickle 16 and lower guard 17 need not be dismantled. This method of converting a harvester sickle bar from one type to a second type by replacing the distinguishing element only of one type by the distinguishing element of the other type is a departure from the usual practice and results in a very substantial saving of time and labor.

In Figs. 5 and 6 we have shown a modified form of attachment for the upper guard of a sickle bar. In this modification, a bracket 43 mounted on the under side of the guard has secured thereto a pad 44. The pad 44 is preferably integral with the upper guard and is provided with a slot 46 having an open end which allows transverse insertion of a T-bolt 47. The ends of the pad 44 adjacent the slot 46 are upset, as at 48, to provide stops for preventing the bolt 47 from turning when the bolt head is located therebetween. To change from one type of sickle bar to another when this form of attachment is used, it is only necessary to loosen the nut 49 until the head of T-bolt 47 clears the stops 48, whereupon the upper guard may be detached from the assembly. Another type of upper guard may then be substituted by the reverse process.

It is to be understood that we do not limit ourselves to the form of the sickle guard shown and described herein, as the invention, as set forth in the following claims may be embodied in a plurality of forms.

We claim:

1. In a sickle bar, an upper sickle guard and a lower sickle guard, said upper sickle guard having a pad intermediate its ends and disposed in abutting relationship with said lower sickle guard.

2. In a sickle bar, an upper sickle guard and a lower sickle guard, said upper sickle guard having a pad intermediate its ends and disposed in abutting relationship with said lower sickle guard, said pad being provided with a slot adapted to receive a connecting bolt.

3. In a sickle bar, an upper sickle guard and a lower sickle guard, said upper sickle guard having a pad intermediate its ends and disposed in abutting relationship with said lower sickle guard, said pad being provided with a slot and fastening means utilizing said slot for connecting said guards.

4. In a sickle bar, an upper sickle guard and a lower sickle guard, said upper sickle guard having a pad disposed in abutting relationship with said lower sickle guard, said pad being provided with a slot, a bolt passing through said slot and means adjacent said slot and engageable with said bolt for preventing turning movement of said bolt.

5. In a sickle bar, an upper sickle guard and a lower sickle guard, said upper sickle guard having a pad disposed in abutting relationship with said lower sickle guard, said pad being provided with a slot, a bolt adapted to register in said slot and a raised portion on said pad adjacent said slot for preventing turning movement of said bolt.

6. In a sickle bar, an upper sickle guard and a lower sickle guard, said upper sickle guard having a pad disposed in abutting relationship with said lower sickle guard, said pad being provided with a slot having an open end, a bolt adapted to register with said slot and means adjacent said slot and engageable with said bolt for preventing turning movement of said bolt.

7. In a sickle bar, an upper sickle guard and a lower sickle guard, said upper sickle guard having a pad disposed in abutting relationship with said lower sickle guard, said pad being provided with a slot having an open end, a T-bolt adapted to register with said slot and upset ends on said pad adjacent said slot for preventing turning movement of said T-bolt.

8. In a sickle bar, a plurality of sickle guards, one of said sickle guards including a member having a plurality of projecting fingers, means for mounting another of said sickle guards, and means independent of said first-mentioned mounting means for mounting said one sickle guard whereby it may be removed or attached without removal of said another of said sickle guards to provide a construction which can be readily changed from one type to another by replacement of said one sickle guard by a sickle guard of a different type.

9. In a sickle bar, a frame, an upper and a lower sickle guard, means for mounting the lower sickle guard on said frame, the upper sickle guard including a member having a plurality of projecting fingers, and means independent of said first-mentioned mounting means for mounting said upper sickle guard whereby it may be removed or attached without removal of said lower sickle guard to provide a construction which can be readily changed from one type to another by replacement of said upper sickle guard by a sickle guard of a different type.

10. In a sickle bar, a body portion including a sickle guard, means for mounting said body portion, a sickle mounted in said body portion adapted to cooperate with any one of a plurality of guard units, and a mounting station for interchangeably receiving said guard units.

11. In a sickle bar, a body portion including a sickle guard, means for mounting said body portion, a sickle mounted in said body portion and adapted to cooperate with any one of a plurality of material directing guard units, and a mounting station independent of said first mentioned mounting for interchangeably receiving said guard units.

AUGUST D. BRAASCH.
HORATIO W. SMITH.
NORRIS WALTON.